United States Patent
Vestergaard et al.

(10) Patent No.: US 7,269,638 B2
(45) Date of Patent: Sep. 11, 2007

(54) DISPLAY OF SERVICE PROVIDER IDENTITY DURING DOWNLOAD

(75) Inventors: Bjarne Vestergaard, Aarhus (DK); Franco Montebovi, Lund (SE)

(73) Assignee: Nokia Corporation, Espoo (FI)

( * ) Notice: Subject to any disclaimer, the term of this patent is extended or adjusted under 35 U.S.C. 154(b) by 239 days.

(21) Appl. No.: 10/257,354

(22) PCT Filed: May 2, 2001

(86) PCT No.: PCT/EP01/04905

§ 371 (c)(1),
(2), (4) Date: Nov. 4, 2003

(87) PCT Pub. No.: WO01/86973

PCT Pub. Date: Nov. 15, 2001

(65) Prior Publication Data

US 2004/0077337 A1     Apr. 22, 2004

(30) Foreign Application Priority Data

May 11, 2000   (GB) ................................ 0011405.8

(51) Int. Cl.
*G06F 13/00*      (2006.01)
(52) U.S. Cl. ................... 709/219; 709/227; 719/329

(58) Field of Classification Search ................ 709/217, 709/219, 227, 228; 719/328, 329
See application file for complete search history.

(56) References Cited

U.S. PATENT DOCUMENTS

| | | | |
|---|---|---|---|
| 5,572,643 A * | 11/1996 | Judson ........................ | 709/218 |
| 5,870,683 A * | 2/1999 | Wells et al. ................. | 455/566 |
| 5,915,214 A * | 6/1999 | Reece et al. ................. | 455/406 |
| 5,970,133 A | 10/1999 | Salimando ................... | 379/213 |
| 6,332,024 B1* | 12/2001 | Inoue et al. ........... | 379/433.06 |
| 6,463,534 B1* | 10/2002 | Geiger et al. ................ | 713/168 |
| 6,708,217 B1* | 3/2004 | Colson et al. .............. | 709/231 |
| 6,714,990 B1* | 3/2004 | Autio et al. ................. | 709/250 |
| 7,058,691 B1* | 6/2006 | Yu et al. ..................... | 709/207 |

FOREIGN PATENT DOCUMENTS

| | | |
|---|---|---|
| WO | 0004737 | 1/2000 |
| WO | 0014941 | 3/2000 |

* cited by examiner

*Primary Examiner*—Viet D. Vu
(74) *Attorney, Agent, or Firm*—Banner & Witcoff, Ltd.

(57) ABSTRACT

A mobile cellular telephone handset (1) is WAP enabled. Browser connection settings are configured so that whilst connection is being made to a WAP server, the user is provided with a graphical display that indicates the identity of the service provider for the server.

25 Claims, 7 Drawing Sheets

Fig. 3A
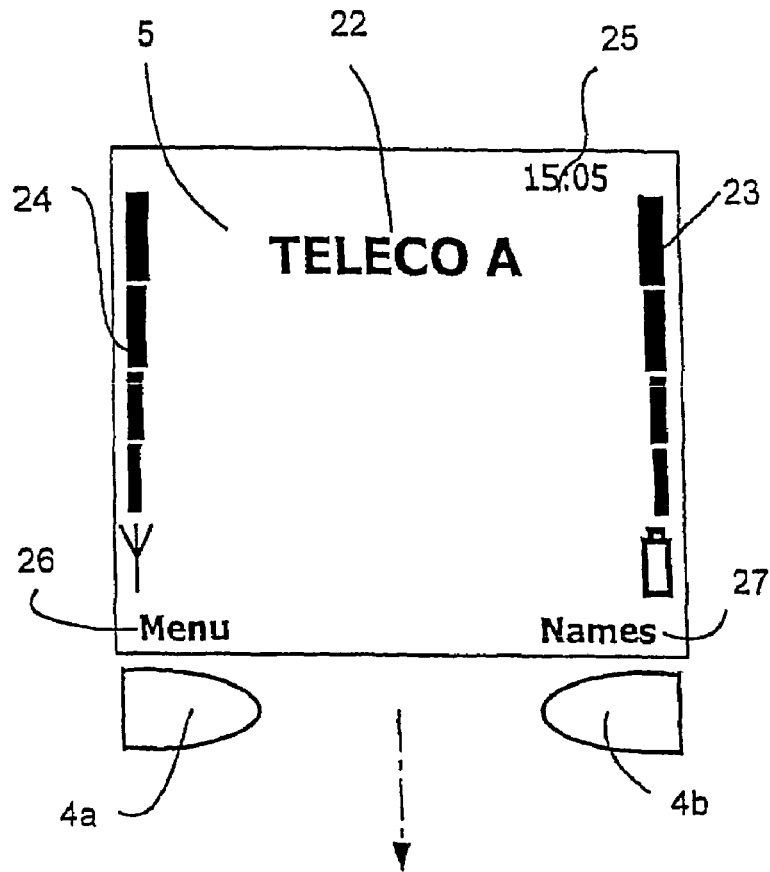
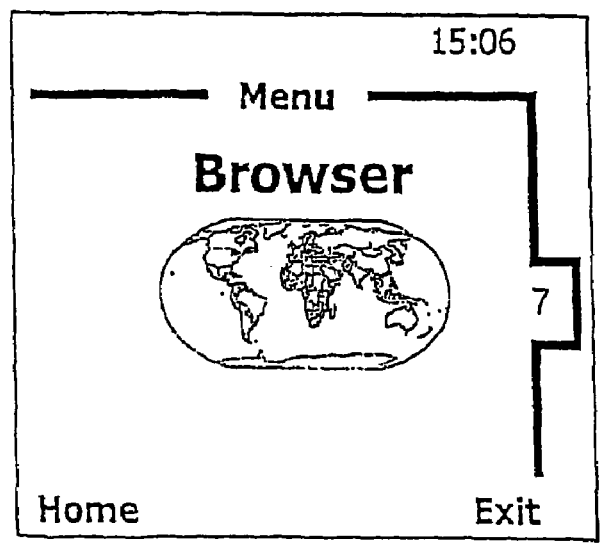
Fig. 3B

Fig. 3C
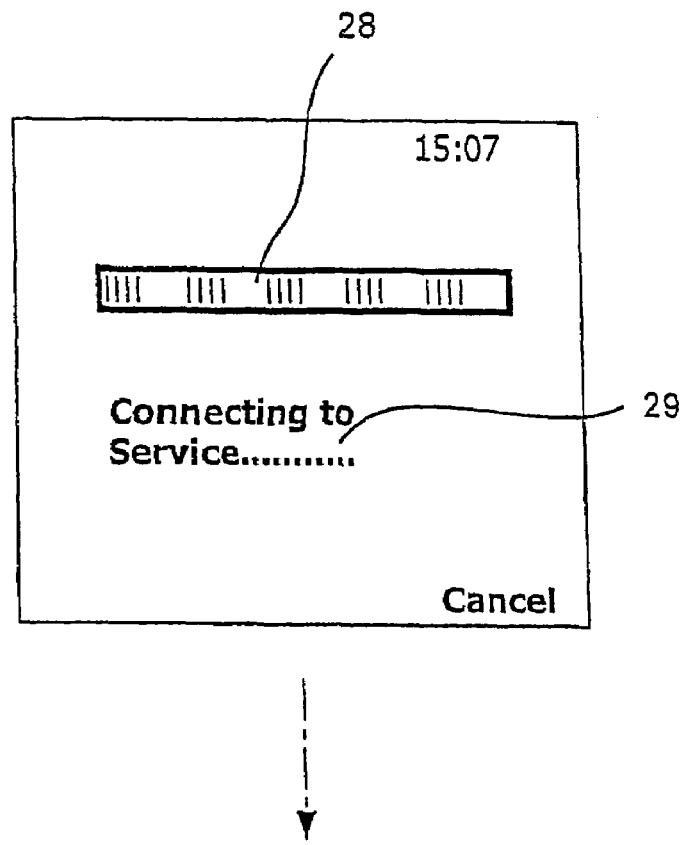
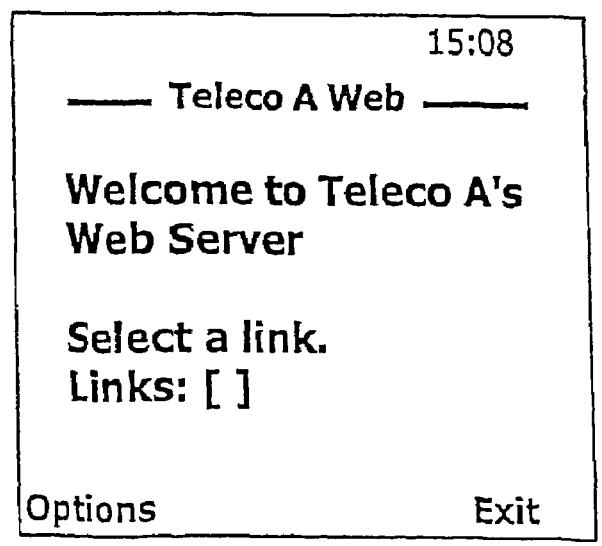
Fig. 3D

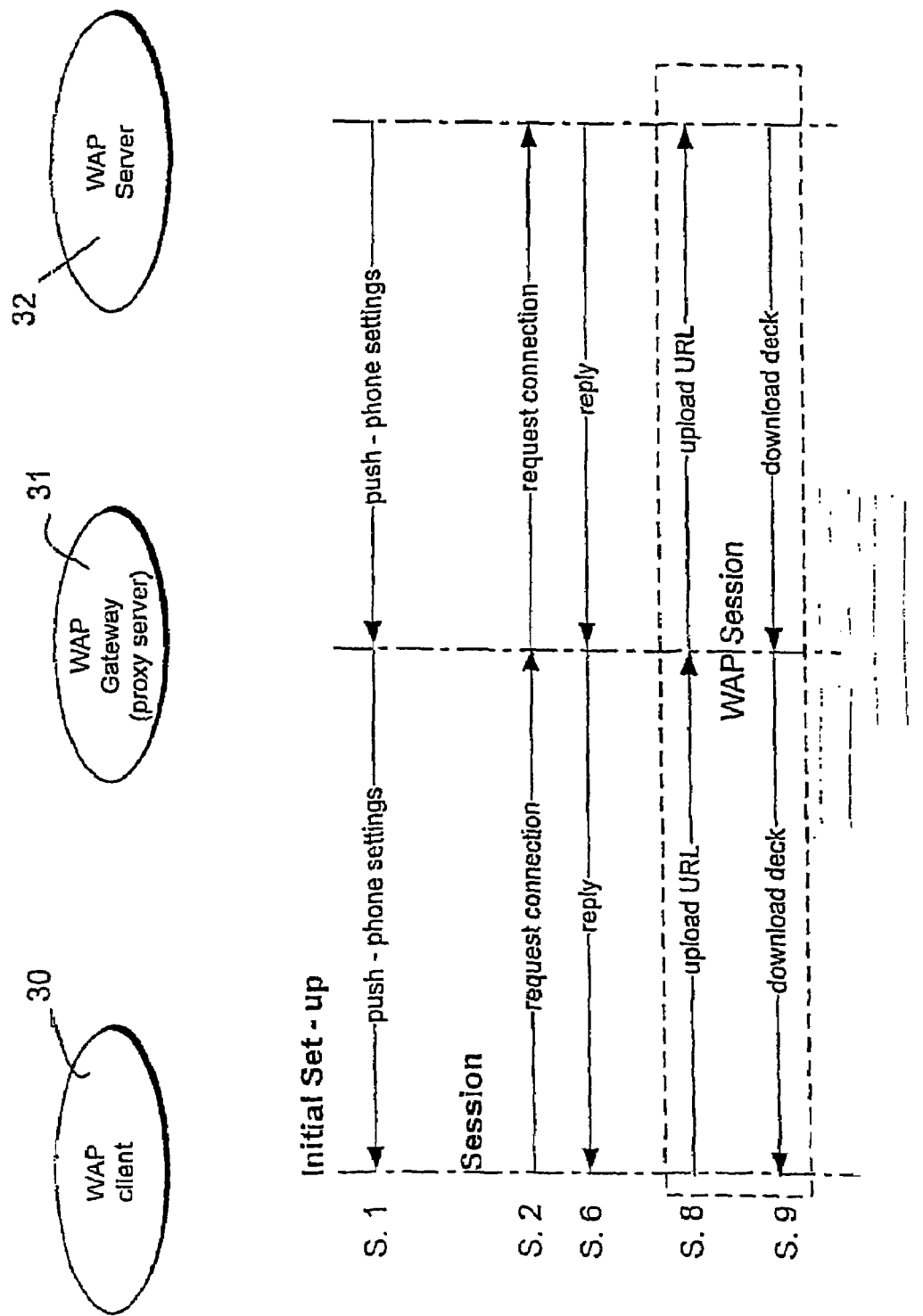

Fig. 6A
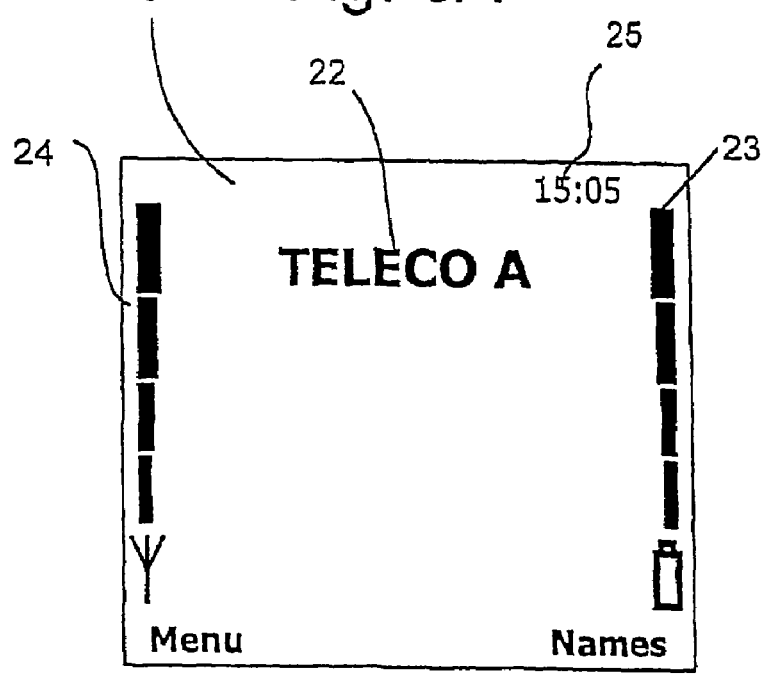
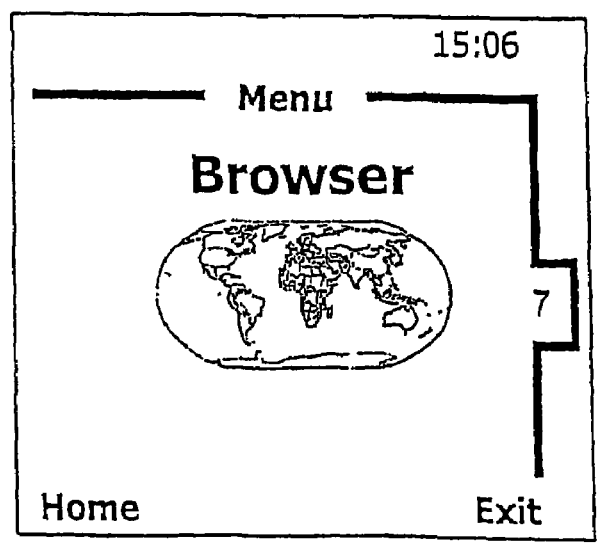
Fig. 6B

Fig. 6C
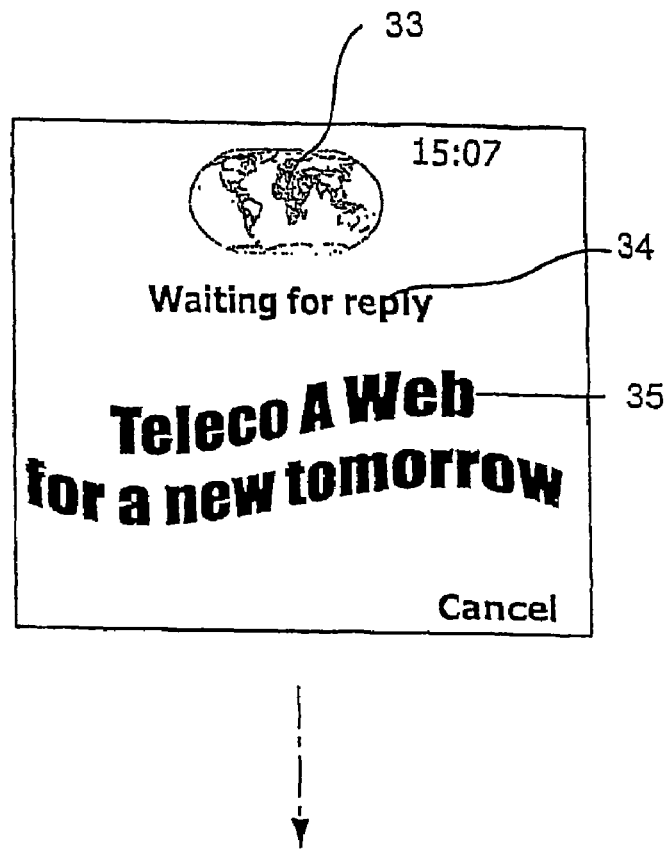
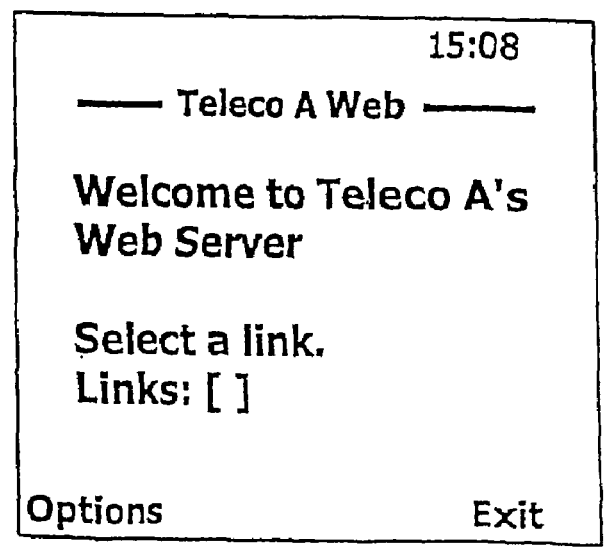
Fig. 6D

DISPLAY OF SERVICE PROVIDER IDENTITY DURING DOWNLOAD

This invention relates to connecting a mobile telecommunications device operable as a client, to a server that acts as a data service provider, and has particular but not exclusive application to mobile telephone handsets for use in a cellular network and also personal digital assistants (PDAs).

Conventional mobile telecommunications devices, such as telephone handsets, have been designed primarily for speech calls and have only a limited capability for handling data. For example, in GSM, a short message service (SMS) has been provided to permit the user to send and receive short text messages that can be transmitted through a cellular public land mobile network (PLMN). More recently, recommendations have been developed to provide a wireless application protocol (WAP) to promote common standards and specifications for data services that operate over wireless communication networks. WAP enabled telephone handsets have been developed which allow the user to access remote servers. Data content is provided in a markup language, similar to conventional hypertext markup language (HTML), known as wireless markup language (WML), which is configured to allow a page of HTML data to be display as a deck of individual cards which are of a size suited for display on the relatively small display screen usually available on a mobile device such as a cellular telephone handset or PDA.

A WAP server can be accessed by dialling an individual telephone number associated with a WAP gateway which acts as a proxy server between the WAP server itself and the mobile device which acts as a client. Thus, individual WAP servers can be accessed by a user, by dialling the telephone numbers associated with the individual WAP gateways that provide access to the servers.

When a WAP enabled mobile telecommunications device is first connected for use with a mobile network, data concerning the telephone numbers, IP addresses and other initialisation information is supplied to the mobile device through the mobile network, in the form of a data message. The initial data is transmitted in a so-called WAP push. In WAP, the transfer of data packets is often termed a "push" and/or a "pull". A pull can be described as a terminal (e.g. mobile handset) accessing a location where provider information is stored and retrieving it, and optionally determining whether the information has been updated to determine whether it should be retrieved. A push can be described as the opposite to a pull, i.e. the server maintains address data necessary to transfer updated information to the terminal so that the data can be sent to the terminal.

Where the network is GSM the push with the initialisation information may be sent using a short message service (SMS) or as an unstructured supplementary data (USSD) as a bearer. Other bearers may be used, of course, depending on the particular network. In this way, the mobile device is provided with a number of pre-set server addresses, which can be selected by the user to provide access to information services, commercial organisations and the Internet in general. By providing the settings initially as a push to the handset, the number of keystrokes that need to be performed on the device to access a server are reduced significantly, which simplifies operation for the user, particularly with the limited keyboard usually associated with the mobile device.

However, when an individual setting is selected by the user in order to make a connection to a WAP server, no indication is given to the user concerning the identity of the service provider for the server, whilst the connection is being established. This gives rise to problems in certain circumstances. For example, when the mobile device roams from its home network to another, it may be preferable to connect to a WAP gateway associated with the roamed network to obtain data services at a local network charge rate. However, when the mobile device roams, selection of one of its pre-set server settings may attempt to make a connection through the roamed network to the home network in order to access the server associated with the setting pre-programmed into the handset. The identity of the server to which connection is being made, is revealed once the connection has been established. Thus, the user only becomes aware that the connection has been made to a non-optimum server, when roaming, after the connection has been made, which wastes time. Also, because the connection will have been made through a roamed network, which may be in a different country, an unwanted relatively high call charge will have been incurred.

Furthermore, when operating with its home network, the mobile device may have a choice of servers that provide a particular type of information. One of the servers may provide the information at no cost whereas another may impose a charge. The user is aware of which server provides the free service. Thus, when one of the pre-programmed settings in the device is used to make a connection, it may connect to the server that imposes a charge for the service. However, this is only revealed to the user when the connection has actually been made rather than during the connection process itself, which wastes time and may also incur unwanted expense.

The present invention seeks to overcome these problems.

In a first aspect, the invention provides a mobile telecommunications device operable as a client for a server that acts as a data service provider, including a transmitter to transmit a request to connect the client to the server through a mobile telecommunications network, and a display configured to display information to the user of the mobile device, whilst the connection is being established, representative of the identity of the data service provider for the server to which the connection is being made.

Thus, in accordance with the invention, the user is provided with information concerning the identity of the data service provider for the server, whilst the connection is being made, so that if the user determines that the connection does not best serve the intended purpose, it can be aborted, without having to wait for the connection actually to be made, thereby saving time and reducing expense.

The device may include a memory to receive the data corresponding to the displayed information, from the network. The displayed information may be graphical information, which may be stored in the memory prior to commencing the making of the connection and retrieved for display whilst the connection is being made.

The data may form part of an ensemble of setting data provided for the device at its initialisation e.g. when initially connected to the network. Alternatively, the data may be provided in response to a request to make the connection.

The display may be operable to provide an indication that the connection is in the course of being made, for example by displaying graphical image which is animated whilst the connection is being made.

The device is particularly suited to use with WAP and may comprise a mobile cellular telephone handset or a PDA.

The invention also includes a method of connecting a mobile telecommunications device as client to a remote server that acts as a data service provider, comprising transmitting a request to connect the client to the server through a mobile telecommunications network, and whilst the connection is being established, displaying information to the user of the mobile telecommunications device representative of the identity of the data service provider for the server to which the connection is being made.

The invention further includes a server, that acts as a data service provider for a mobile telecommunications device operable as client, including means responsive to a request to connect the client to the server through a mobile telecommunications network, to supply data corresponding to the identity of the data service provider to the device so as to permit the device to display information, whilst the connection is being established, representative of the identity of the data service provider for the server.

In order that the invention may be more fully understood an embodiment thereof will now be described by way of example with reference to the accompanying drawings in which:

FIG. 3 illustrates a sequence of displays provided to the subscriber for the handset shown in FIG. 1, during the establishment of a connection to a WAP server, according to a conventional procedure;

FIG. 4 is a schematic illustration of a signal interchange which occurs between the WAP client and server processors, in accordance with the invention;

FIG. 6 is a schematic illustration of the displays provided to the user of the handset during the establishment of a connection to a WAP server, in accordance with the invention.

Figure 1:
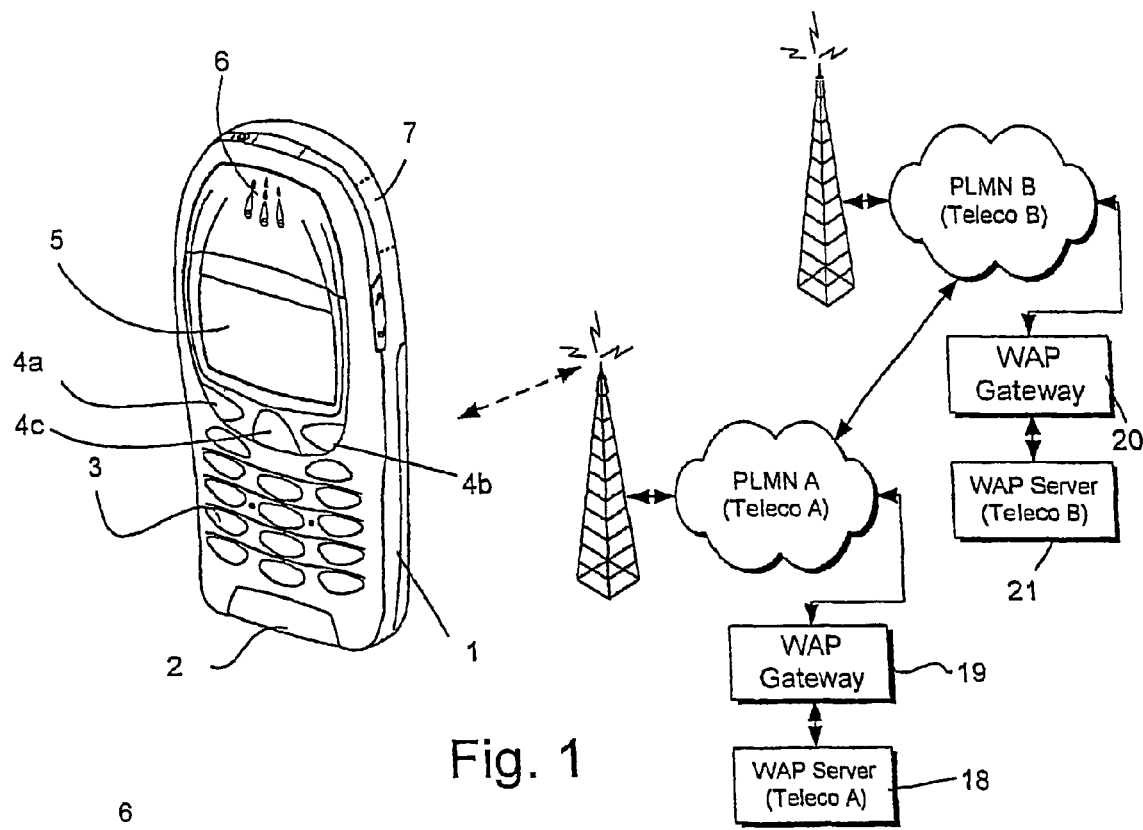
FIG. 1 is a schematic block diagram illustrating a mobile telephone handset which can communicate through a home PLMN (PLMN A) to a WAP server or through a roamed network (PLMN B) to another WAP server.

In FIG. 1, a mobile station in the form of a battery driven telephone cellular handset 1, is shown schematically in radio communication with PLMN A, which acts as its home network. PLMN A is operated by a telecommunications company—Teleco A. A second network PLMN B is also shown, operated by Teleco B. The handset 1 can roam from its home network PLMN A to network PLMN B.

Considering the mobile handset 1, it includes a microphone 2, keypad 3, soft keys 4, a liquid crystal display 5, earpiece 6 and internal antenna 7. As will be explained in more detail, the handset 1 is WAP enabled.

Figure 2:
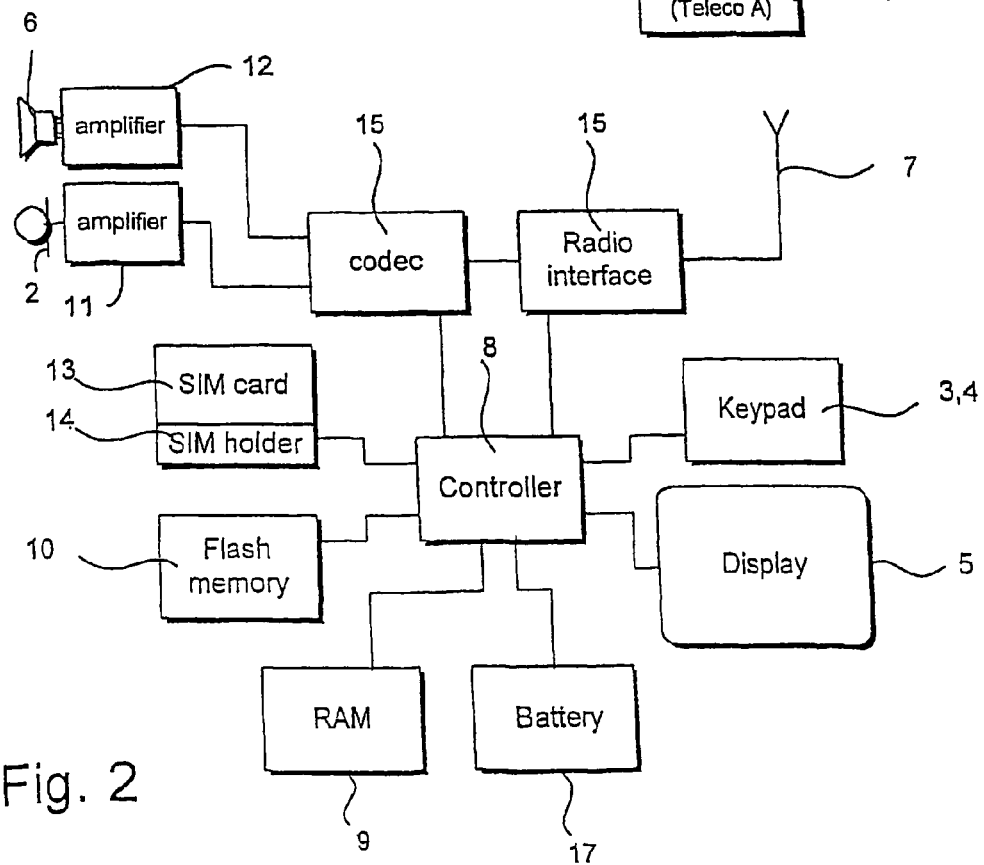
FIG. 2 is a schematic block diagram of the circuitry of the mobile handset shown in FIG. 1.

The circuitry of the handset 1 is shown in more detail in FIG. 2. Signal processing is carried out under the control of a digital micro-controller 8 which has an associated RAM 9 and flash memory 10. Electrical analogue audio signals are produced by microphone 2 and amplified by pre-amplifier 11. Similarly, analogue audio signals are fed to the earpiece 6 through an amplifier 12. The micro-controller receives instruction signals from the keypad and soft keys 3, 4 and controls operation of the LCD display 5.

Information concerning the identity of the user is held on a smart card 13 in the form of a GSM SIM card which contains the usual GSM international mobile subscriber identity and encryption $K_i$ that is used for encoding the radio transmission in a manner well known per se. The SIM card 13 is removably received in a SIM card holder 14. Radio signals are transmitted and received by means of the antenna 7 connected through a rf stage 15 to a codec 16 configured to process signals under the control of a micro-controller 8.

Thus, in use, for speech, the codec 16 receives analogue signals from the microphone amplifier 11, digitises them into a form suitable for transmission and feeds them to the rf stage 15 for transmission through antenna element 7 to PLMN A shown in FIG. 1. Similarly, signals received from PLMN A are fed through the antenna element to be demodulated by the rf stage 15 and fed to codec 16 so as to produce analogue signals fed to amplifier 12 and earpiece 6.

The handset 1 is WAP enable to and capable of receiving date in a predetermined channel e.g. for GSM, at 9.6 Kbit/sec. Also, the handset may be configured to receive a high speed circuit switch data (HSCSD) according to the GSM recommendations, at a data rate from 14.4-43.2 Kbit/sec. It will however be understood that the invention is not restricted to any particular data rate and that higher rates could be used. The WAP content and its applications are specified in a well known set of content formats based on familiar www content formats. WAP is disclosed in the Wireless Application Protocol Architecture Specification; version 30 Apr. 1998, published by the Wireless Application Protocol Architecture Working Group (see also http://www.wapforum.org/docs/technical.htm/arch-30-apr-98.pdf).

As known in the art, the WAP environment (WAE) provides a browser e.g. a micro-browser operable on the handset as a client, for connection to WAP servers. The browser is configured to operate with WML which, as previously mentioned comprises a lightweight markup language similar to HTML but optimised for use in hand-held mobile terminals, WML script—a lightweight scripting language similar to JAVA Script™, wireless telephony application (WTA, WTAI) telephony services and programming interfaces, and content formats—a well known set of data formats including images, phone book records and calendar information.

Data can be downloaded to the browser from a WAP server such as server 18 shown in FIG. 1. The server 18 provides WML decks of cards, corresponding to conventional pages of HTML such that a deck can be downloaded to the handset 1 and the individual cards manipulated for display by means of the keys 3, 4. The server 18 is accessed through a gateway 19 which acts as a proxy server. The handset 1 can access the gateway 19 by dialling a predetermined telephone number. The data service provider which operates the server 18 has a predetermined identity. In this example, the service provider for WAP server 18 comprises the operator of the network PLMN A, namely Teleco. A. PLMN B is provided with a similar gateway 20 and server 21 operated by Teleco. B. In this example, the networks are both GSM networks with PLMN B in a different country from the home network PLMN A. It will however be understood that the invention is not restricted to GSM and can be used with any network protocol providing a suitable bearer.

In order to simplify operation of the browser on the handset 1, settings for the browser are sent as a push to the handset 1 from the network when the handset is initially connected to the network PLMN A. Thus, the network provides the handset with telephone numbers and IP addresses for servers that the user can access to receive WAP data. Furthermore, these settings for the handset can be updated by subsequent pushes from the network.

FIGS. 3a-c illustrate displays presented to the user of handset 1 during the process of making a connection to a WAP server.

FIG. 3a illustrates a situation where the handset 1 is in idle mode, in communication with PLMN A. A banner 22 "Teleco. A" indicates that the handset 1 has registered with the cellular network PLMN A. The display includes a conventional battery charge display 23 that indicates the remaining capacity of the battery as a bar chart, together With display 24 which indicates the signal strength received from PLMN A. Display 25 comprises a digital clock operated by the controller 8 shown in FIG. 2. Legends 26, 27—"menu, names" indicate the functionalities attributed to soft keys 4a and 4b as shown in FIG. 1.

Then, the user operates the keys 4a, 4b to select the WAP browser, which is displayed as shown in FIG. 3b. The user then selects the pre-loaded settings corresponding to WAP server 18. The handset 1 then automatically dials the telephone number associated with the gateway 19 for server 18 in order to establish a data exchange between the browser 1 and the WAP server 18, with the WAP gateway 19 acting as a proxy server for the data interchange process.

Whilst the connection is being made, a display as shown in FIG. 3b is provided for the user of the handset 1. An animated bar chart 28 indicates that the connection is being made and a banner 29 is provided indicating that the connection is being established.

When the connection to server 18 is completed, a deck corresponding to the home page for the server is downloaded to the browser on handset 1. The first page of the deck is shown in FIG. 3d.

Whilst this prior art process is generally satisfactory, it will be seen that whilst the connection is being established, the user is provided with a display as shown in FIG. 3c which gives no indication as to the server to which connection is being made. The connection may take of the order of 2-45 seconds to become established i.e. the display shown in FIG. 3c may be shown for this period of time before the display of FIG. 3d become available to the user.

This can give rise to a problem in certain circumstances. For example, when the handset roams to PLMN B, the handset 1 will have registered with Teleco B. However, the previously loaded WAP setting in handset 1 are configured to make a connection to WAP gateway 19. Thus, when the browser is selected as shown in FIG. 3b and web access is selected in accordance with the pre-loaded settings, a connection will be made to WAP gateway 19 through PLMN B. This will involve an international call because the handset has roamed from PLMN A to PLMN B, in another country. However, to mitigate the costs, the user could instead call WAP gateway 20 associated with PLMN B i.e. a local gateway, to obtain corresponding services to those provided by server 18 connected to PLMN A. Whilst the connection is being made according to the preloaded settings, the user is unable to determine the actual gateway being called. It is only when the display of FIG. 3d is actually shown to the user, that it will be appreciated that the setting in the handset has caused a relatively expensive international call to server 18 to be set up. If the user wishes to save money, the call is terminated and another call is made using an appropriate address for gateway 20 associated with PLMN B, at a local call rate. The re-calling process is relatively time consuming and inconvenient, and furthermore, will have incurred a charge at international rates for the terminated call.

An example of the invention will now be described which seeks to overcome this problem. Referring to FIG. 4, it will be understood that the previously described configuration gives rise to a WAP client process 30 at handset 1, a WAP gateway process 31 at the called WAP gateway and a WAP server process 32 at the server to which connection is established. A data interchange between the client, gateway and server processes 30, 31 and 32 will now be described. As previously explained, the WAP enabled handset is pre-loaded with browser settings in order to simplify its operation. Thus, referring to FIG. 4, at step S1 a so-called WAP push is carried out so that the server 30 transfers settings about itself via gateway 31 to the WAP client 30 at the handset 1. These settings are stored in memory 10 (FIG. 2) The general configuration of the phone settings is shown in Table 1.

TABLE 1

| Server | IP Address | MSISDN | SP graphical information | Other Data |
|---|---|---|---|---|
| Teleco A (18) | abc | +33xyz | graphic for A | dialling graphic |
| Teleco A (20) | pqr | +44xyz | graphic for B | dialling graphic |
| ... | ... | ... | ... | ... |
| ... | ... | ... | ... | ... |

Settings for a number of different servers are provided to the handset so that it can access them individually. For each server e.g. server 18, the identity of the server is provided, its corresponding IP address, together with an international subscriber dialling number (MSISDN). Also, according to the invention, graphical information is provided corresponding to the identity of the server. The pushed phone setting information may also include an animated dialling graphic to be explained in more detail hereafter, together with other data according to the WAP protocol for defining security settings and other functions not directly relevant to the example of the invention.

Figure 5:
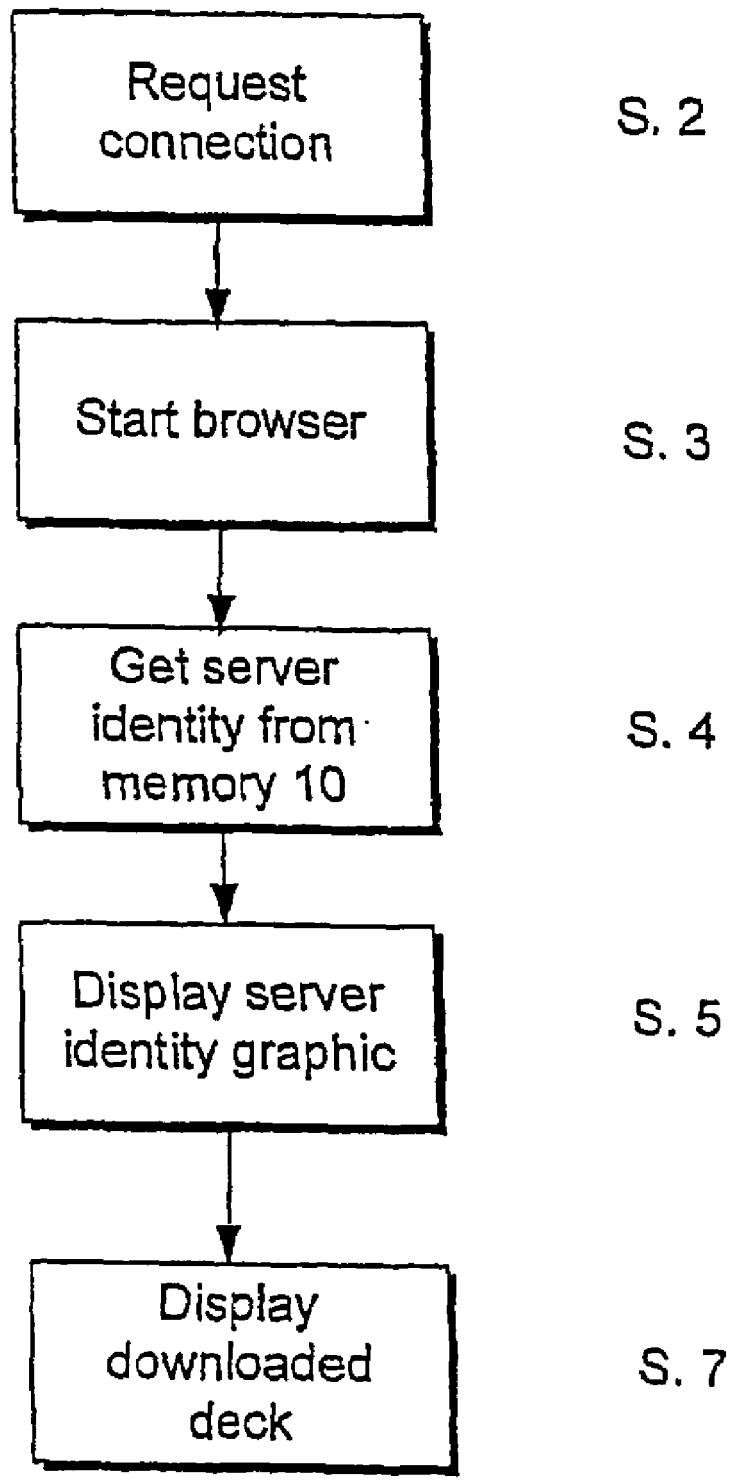
FIG. 5 is a schematic block diagram of process steps that occur at the handset whilst a connection is being made to the WAP server.

When the user subsequently decides to access a WAP server, in order to establish a WAP session, steps S2-S9 are carried out. In the following example, it is assumed that the handset 1 is in communication with PLMN A. The various process steps associated with the session are shown in FIG. 5 and corresponding displays on the display 5 of handset 1 are shown in FIG. 6.

At step S2 (FIG. 4), the user operates the soft keys 4 to request connection 15 to the web server for Teleco A, namely server 18 (FIG. 1). As a result, a request is sent from client process 30 via the gateway process 31 to WAP server process 32. In this example, the WAP gateway process 31 resides at gateway 19 in FIG. 1 and the server process 32 resides at server 18.

As shown in FIG. 6a, the display 5 provides an initial display corresponding to FIG. 3a, indicating an idle mode connection to PLMN A. When the request is sent at step S2, the browser is started on the handset, as shown at step S3 in FIG. 5.

Then, as shown at step S4, the server identity graphical information for server 18 is obtained from memory 10 shown in FIG. 2, the information having been sent as a push at step S1 during the initial set-up of the handset (see Table 1). The retrieved graphical information is then displayed on display 5, as shown at step S5, and as illustrated in FIG. 6c. The graphical information consists of an animated dialling graphic 33, in this example, a representation of the earth, which rotates whilst the connection is being established between handset 1 and server 18. The display also includes a banner 34, "waiting for reply" to notify the user that the connection is in the process of being made. The display further includes graphical information which identifies the service provider for the server 18, namely Teleco A. This is provided in a graphical form which may be itself animated.

Thereafter, the connection between the handset 1 and server 18 becomes established so that the home page for the web server becomes downloaded to the browser of handset 1, as shown in FIG. 6d. The downloading of the home page is shown as step S6 in FIG. 4 and the corresponding display of the deck associated with the home page is shown at step S7 in FIG. 5.

Thereafter, the user can select a link and a corresponding URL is uploaded to the server at step S8 shown in FIG. 4. Corresponding downloaded data in the form of a WML deck is shown at step S9.

Thus, in accordance with the invention, whilst the browser is establishing a connection to server 18, the user is informed of the identity of the service provider for server 18 by means of the graphical display 35, as shown in FIG. 6c. Furthermore, the user is provided with an indication by means of the graphic 33 that the connection is in the process of being made.

It will therefore be understood that when the user roams from PLMN A to PLMN B, as previously described, identity of the service provider for a server associated with of the pre-loaded settings in the handset 1 can immediately be detected once an attempt is made to connect to the server. The user is immediately advised by means of the display shown in FIG. 6c, that the connection is being attempted back to the server A associated with home network PLMN A, rather than attempting to make a cheaper connection to the local server 21 associated with roamed PLMN B. Thus, the user can immediately abort the connection and make an alternative server choice.

The display shown in FIG. 6c also gives rise to an advantage when more than one web server is provided for an individual PLMN, offering corresponding services, and one of the service providers is cheaper than the other. Thus, the handset when operating according to the prior art procedure shown in FIG. 3 does not identify to the user the server to which connection is being made. Thus, the user does not know until the connection has been made whether it has been established with the relatively cheap or expensive service provider. The user is only informed of this information once the connection has been made, as shown in FIG. 3d. However, in accordance with the invention, in this situation, the user is provided with the identity of the server to which connection is being made, whilst the connection is being established as shown in FIG. 6c and does not have to wait until the display of FIG. 6d to determine the identity of the sever to which connection has actually been made.

Many modification and variations of the described example of the invention, will be evident. For example, whilst the invention is being described in relation to the a GSM system, it will be understood that it could be used with any wireless network suitable for WAP information interchange such as UMTS, CDPD, CDMA, PDS, PDC, TDMA, DECT and the like. Furthermore, the invention may make use of any suitable bearer available under the above networks.

Furthermore, the provision of data concerning the identity of the service provider for the individual servers need not necessarily be supplied in a push as an initial setting up step for the mobile device. Instead, it may be supplied in response to each individual request for connection to the server. The data need not necessarily be supplied on an SMS or USSD bearer but can use any suitable bearer, depending upon the availability under the particular network.

It will be understood that the invention is not restricted to mobile telephone handsets and can be used with PDAs, portable computing apparatus and other mobile devices. Furthermore, the network need not necessarily be cellular.

The invention claimed is:

1. A mobile telecommunications device for use in a cellular radio mobile telecommunications network, the device being operable as a client for a server that acts as a data service provider and the device further being connectable to the server via a gateway that is operated by a mobile telecommunications network operator, the mobile telecommunications device comprising:

a receiver to receive a push transfer of data, including settings to connect to said gateway, on connection to a mobile telecommunications network operated by said mobile telecommunications network operator;

the receiver further being operable to receive a push transfer of data from the server comprising information representative of the identity of a mobile telecommunications network operator operating the gateway;

a transmitter to transmit a request for establishment of a communication session with said gateway via one or more mobile telecommunications networks, including the mobile telecommunications network operated by said mobile telecommunications network operator; and a display configured to display the information received, representative of the identity of the mobile telecommunications network operator, while the communication session is being established.

2. The mobile telecommunications device according to claim 1 wherein the display is configured to display said information as graphical information.

3. The mobile telecommunications device according to claim 1, including a memory to receive said data comprising information representative of the identity of the mobile telecommunications network operator operating the gateway.

4. The mobile telecommunications device according to claim 3 wherein the data comprising information representative of the identity of the mobile telecommunications network operator operating the gateway is stored in the memory prior to commencement of the establishment of the session and retrieved for display while the session is being established.

5. The mobile telecommunications device according to claim 4 wherein that data comprising information representative of the identity of the mobile telecommunications network operator operating the gateway forms part of an ensemble of setting data provided for the mobile telecommunications device at initialization thereof.

6. The mobile telecommunications device according to claim 4 wherein the data comprising information representative of the identity of a mobile telecommunications network operator operating the gateway is provided thereto in response to a request to establish the communication session.

7. The mobile telecommunications device according to claim 1, wherein the display is operable to provide an indication that the communication session is in the course of being established.

8. The mobile telecommunications device according to claim 7 wherein the indication comprises a graphical image that is animated while communication session is being established.

9. The mobile telecommunications device according to claim 1, which is WAP enabled.

10. The mobile telecommunications device according to claim 1, that comprises a mobile cellular telephone handset.

11. The mobile telecommunications device according to claim 1, that comprises a PDA.

12. A method of connecting a mobile telecommunications device, for use in a cellular radio mobile telecommunications network, as a client to a remote server that acts as a data service provider, the device being connectable to the server via a gateway that is operated by a mobile telecommunications network operator, the method comprising:

receiving a push transfer of data, including settings to connect to said gateway, on connection to a mobile telecommunications network operated by said mobile telecommunications network operator;

receiving a push transfer of data from the server comprising information representative of the identity of the mobile telecommunications network operator operating the gateway;

transmitting a request to establish a communication session with said gateway via one or more mobile telecommunications networks, including the mobile telecommunications network operated by said mobile telecommunications network operator, and whiles the session is being established, displaying the received information representative of the identity of the mobile telecommunications network operator.

13. A method according to claim 12 including receiving the data comprising information representative of the identity of a mobile telecommunications network operator operating the gateway in response to the request to establish a communication session with the gateway.

14. A method according to claim 12 wherein the displayed information comprises graphical information.

15. A method according to claim 14 wherein the graphical information is stored in the mobile telecommunications device and retrieved for display while the communication session is being established.

16. A method according claim 12 including displaying an indication to the user of the mobile telecommunications device that the communication session is in the course of being established.

17. A method according to claim 16 wherein the indication comprises a graphical image that is animated while the communication session is being established.

18. A server that acts as a data service provider for a mobile telecommunications device operable as client and for use in a cellular radio mobile telecommunications network, the server being connectable to the device via a gateway that is operated by a mobile communications network operator, the server including means responsive to a request to establish a communication session between the client and the gateway via one or more mobile telecommunications networks, including the mobile telecommunications network operated by said mobile telecommunications network operator, to supply data comprising information representative of the identity of the mobile telecommunications network operator operating the gateway push transfer of data to the mobile telecommunications device so as to permit the mobile telecommunications device to display information, while the session is being established, representative of the identity of the mobile telecommunications network operator operating the gateway.

19. A method of operating a server that acts as a data service provider for a mobile telecommunications device for use in a cellular radio mobile telecommunications network and operable as a client through a network, the server being connectable to the device via a gateway that is operated by a mobile telecommunications network operator, the method comprising supplying data corresponding to the identity of the mobile telecommunications network operator operating the gateway in a push transfer of data to the mobile telecommunications device such as to permit the mobile telecommunications device to display information, while a communication session with said gateway via one or more mobile telecommunications networks, including the mobile telecommunications network operated by said mobile telecommunications network operator, is being established, representative of the identity of the mobile telecommunications network operator operating the gateway.

20. A method according to claim 19 including supplying the information as part of an ensemble of settings data for initializing the mobile telecommunications device when the mobile telecommunications device is connected to the network operated by said mobile telecommunications network operator.

21. A method according to claim 19 including receiving a request for the communication session to be established and supplying the information in response thereto.

22. A mobile telecommunications network configured to provide a connection between a server that acts as a data service provider and a mobile telecommunications device for use in a cellular radio mobile telecommunications network and operable as a client for the server via a gateway that is operated by a mobile telecommunications network operator, the network being configured to convey data, including settings to connect to said gateway, on connection by the mobile telecommunications device to a mobile telecommunications network operated by said mobile telecommunications network operator in a push transfer of data to the mobile telecommunications device and to convey data corresponding to the identity of the mobile telecommunications network operator operating the gateway in a push transfer of data to the mobile telecommunications device such as to permit the mobile telecommunications device to display information, while a communication session is being established between the telecommunications device and the gateway via one or more mobile telecommunications networks, including the mobile telecommunications network operated by said mobile telecommunications network operator, representative of the identity of the mobile telecommunications network operator operating the gateway.

23. A computer readable medium storing a computer program for a mobile telecommunications device for use in a cellular radio mobile telecommunications network and operable to connect to a remote server that acts as a data service provider via a gateway that is operated by a mobile telecommunications network operator, the computer program comprising executable code that when executed in the mobile telecommunications device enables the mobile telecommunications device to receive a push transfer of data, including settings to connect to said gateway, on connection to a mobile telecommunications network operated by said mobile telecommunications network operator;

receive a push transfer of data from the server comprising information representative of the identity of the mobile telecommunications network operator operating the gateway;

transmit a request to establish a communication session with said gateway via one or more mobile telecommunications networks, including the mobile telecommunications network operated by said mobile telecommunications network operator; and while the session is being established, display the received information, representative of the identity of the mobile telecommunications network operator.

24. A computer readable medium storing a computer program for a server that acts as a data service provider for a mobile telecommunications device for use in a cellular radio mobile telecommunications network and operable as a client through a network, the server being connectable to the device via a gateway that is operated by a mobile telecommunications network operator, the computer program comprising executable code that when executed by the server enables the server to supply data corresponding to the identity of the mobile telecommunications network operator operating the gateway in a push transfer of data to the mobile telecommunications device such as to permit the mobile telecommunications device to display information, while a communication session with said gateway via one or more mobile telecommunications networks, including the mobile telecommunications network operated by said mobile telecommunications network operator, is being established, representative of the identity of the mobile telecommunications network operator operating the gateway.

25. A system comprising:

a gateway connected to a server to provide data services, the gateway being operable by a mobile telecommunications network operator;

a mobile telecommunications device for use in a cellular radio mobile telecommunications network and connectable to said gateway via one or more mobile telecommunications networks, including a mobile telecommunications network operated by said mobile telecommunications network operator, to receive said data services, the mobile telecommunications device comprising:

a receiver to receive a push transfer of data, including settings to connect to said gateway, on connection to the mobile telecommunications network operated by said mobile telecommunications network operator;

the receiver further being configured to receive a push transfer of data from the server comprising information representative of the identity of the mobile telecommunications network operator operating the gateway;

a transmitter to transmit a request for the establishment of a communication session with said gateway via said one or more mobile telecommunications networks, and a display configured to display the received information representative of the identity of a mobile telecommunications network operator operating the gateway, while the session is being established.

* * * * *

UNITED STATES PATENT AND TRADEMARK OFFICE
CERTIFICATE OF CORRECTION

| | | |
|---|---|---|
| PATENT NO. | : 7,269,638 B2 | Page 1 of 1 |
| APPLICATION NO. | : 10/257354 | |
| DATED | : September 11, 2007 | |
| INVENTOR(S) | : Bjarne Vestergaard et al. | |

It is certified that error appears in the above-identified patent and that said Letters Patent is hereby corrected as shown below:

On the Title page, § 371 (c)(1), (2), (4) Date:
    Please replace "Nov. 4, 2003" with --Nov. 14, 2003--

On the Title page, Abstract section (57):
    Please remove "(1)"

In Column 9, Claim 12, Line 16:
    Please replace "whiles" with --while--

In Column 9, Claim 18, Line 49:
    Please replace "gateway push" with --gateway in a push--

Signed and Sealed this

First Day of July, 2008

JON W. DUDAS
*Director of the United States Patent and Trademark Office*